United States Patent
Furukawa

(10) Patent No.: US 10,294,345 B2
(45) Date of Patent: May 21, 2019

(54) ETHYLENE-ACRYLIC RUBBER COMPOSITION, ETHYLENE-ACRYLIC RUBBER, RUBBER METAL COMPOSITE, AND BONDED PISTON SEALING

(71) Applicant: NOK Corporation, Tokyo (JP)

(72) Inventor: Tomonori Furukawa, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/308,715

(22) PCT Filed: Apr. 30, 2015

(86) PCT No.: PCT/JP2015/063020
§ 371 (c)(1),
(2) Date: Nov. 3, 2016

(87) PCT Pub. No.: WO2015/170668
PCT Pub. Date: Nov. 12, 2015

(65) Prior Publication Data
US 2017/0190868 A1    Jul. 6, 2017

(30) Foreign Application Priority Data

May 8, 2014    (JP) ................................. 2014-097223

(51) Int. Cl.
C08K 3/22       (2006.01)
C08L 33/08      (2006.01)
C08J 5/12       (2006.01)
F16J 15/10      (2006.01)
C08J 3/24       (2006.01)
C08K 5/14       (2006.01)

(52) U.S. Cl.
CPC ................... C08K 3/22 (2013.01); C08J 3/24 (2013.01); C08J 5/12 (2013.01); C08K 5/14 (2013.01); C08L 33/08 (2013.01); F16J 15/10 (2013.01); F16J 15/102 (2013.01); C08J 2323/08 (2013.01); C08J 2333/10 (2013.01); C08K 2003/2206 (2013.01)

(58) Field of Classification Search
CPC . C08K 3/22; C08K 3/2206; C08K 5/14; C08J 3/24; C08J 3/243; C08J 2333/06; C08J 2333/08; C08J 2333/10; C08J 5/12; C08J 5/121; C08J 5/122; C08J 5/124; C08J 5/125; C08J 5/127; C08J 5/128; C08L 33/08; F16J 15/10; F16J 15/102
See application file for complete search history.

(56) References Cited

U.S. PATENT DOCUMENTS

2002/0111407 A1    8/2002  Takesue et al.
2009/0283972 A1*   11/2009 Nishimura ............. F16D 25/12
                                                        277/489
2011/0291365 A1   12/2011  Hirose

FOREIGN PATENT DOCUMENTS

| CN | 101784632 | 7/2010 |
|---|---|---|
| GB | 1101411 | * 1/1968 |
| JP | 63291982 | 11/1988 |
| JP | 3020908 | 1/1991 |
| JP | 7149965 | 6/1995 |
| JP | H08283482 | 10/1996 |
| JP | 10121020 | 5/1998 |
| JP | 2002177414 | 6/2002 |
| JP | 2008051125 | 3/2008 |
| JP | 5011886 | 6/2012 |
| KR | 20100060719 | 6/2010 |
| WO | WO2011010615 | 7/2010 |

OTHER PUBLICATIONS

International Preliminary Report on Patentability from IA No. PCT/JP2015/063020 dated Nov. 11, 2015.
International Search Report from IA No. PCT/JP2015/063020 dated Jun. 30, 2015.
First Office Action from Chinese Application No. 201580022386.9 dated Jul. 3, 2017.
Second Office Action from Chinese Application No. 201580022386.9 dated Feb. 12, 2018.
Third Office Action from Chinese Application No. 201580022386.9 dated Jun. 8, 2018.
Extended European Search Report from European Application No. 15789404.9 dated Nov. 7, 2017.
Article 94(3) from European Application No. 15789404.9 dated Jan. 4, 2019.

* cited by examiner

Primary Examiner — Roberto Rabago
(74) Attorney, Agent, or Firm — K. David Crockett, Esq.; Niky Economy Syrengelas, Esq.; Crockett & Crockett, PC

(57) ABSTRACT

An object of the present invention is to provide an ethylene-acrylic rubber composition that is excellent in the compression set and also in the crosslinking bonding even when no secondary crosslinking is caused therein, an ethylene-acrylic rubber produced by causing primary crosslinking in the composition, a rubber metal composite formed by bonding the ethylene-acrylic rubber and a metal with each other, and a bonded piston sealing including the rubber metal composite. The object is achieved by an ethylene-acrylic rubber composition including 1 to 7 PHR by weight of calcium hydroxide relative to 100 PHR by weight of a binary ethylene-acrylic rubber polymer that includes ethylene and an acrylic acid ester, an ethylene-acrylic rubber produced by causing peroxide-crosslinking by primary crosslinking in the ethylene-acrylic rubber composition, a rubber metal composite formed by crosslinking-bonding the ethylene-acrylic rubber and a metal with each other bonded with the primary crosslinking, and a bonded piston sealing including the rubber metal composite.

5 Claims, No Drawings

ETHYLENE-ACRYLIC RUBBER COMPOSITION, ETHYLENE-ACRYLIC RUBBER, RUBBER METAL COMPOSITE, AND BONDED PISTON SEALING

FIELD OF THE INVENTIONS

The present invention relates to an ethylene-acrylic rubber composition that is excellent in the compression set and also in the crosslinking bonding even without causing any secondary crosslinking therein, an ethylene-acrylic rubber produced by causing primary crosslinking in the composition, a rubber metal composite formed by bonding the ethylene-acrylic rubber and a metal with each other, and a bonded piston sealing including the rubber metal composite.

BACKGROUND OF THE INVENTIONS

A bonded piston sealing (BPS: including a piston sealing, a canceller sealing, a drum sealing, and the like) of a rubber lip crosslinking-bonded type, used in clutch coupling in an automatic transmission (AT) of a vehicle such as an automobile, generally includes a metal ring that is oil-hydraulically actuated in the automatic transmission (is caused to conduct a reciprocal motion), and a rubber sealing that is crosslinking-bonded to the metal ring and that achieves a sealing action.

As described also in Patent Document 1, a sulfur crosslinking-based acrylic rubber (ACM) is applied to the rubber for the BPS.

The crosslinking density of the ACM is increased by causing secondary crosslinking therein as a feature of the polymer for the ACM to be used.

PRIOR ART DOCUMENTS

Patent Documents

Patent Document 1: JP-B-5011886
Patent Document 2: JP-A-10-121020
Patent Document 3: WO2011/010615

SUMMARY

It is advantageous for a product having a large volume like the BPS that a secondary crosslinking step can be omitted to reduce the process cost.

To specifically realize the above, a rubber material is desired that is excellent in the compression set (that is, whose compression set rate is low) even without causing any secondary crosslinking therein.

The inventor studied a change of the material to an ethylene-acrylic rubber (AEM) as one approach of developing a material that is excellent in the compression set even without causing any secondary crosslinking therein.

Types of AEM include a binary type AEM that contains ethylene applicable with peroxide-crosslinking, and an acrylic acid ester, and a ternary type AEM that enables amine crosslinking by adding thereto a crosslinking site monomer (a carboxylic acid monomer). It turned out that, of these types, the binary type AEM was excellent in the compression set even without causing any secondary crosslinking therein.

It however turned out that the binary type AEM had a further problem that this AEM was inferior in the crosslinking bonding property. Because the BPS is configured by crosslinking-bonding a metal with a rubber as above, when the binary type AEM is used in such a use, crosslinking-bonding thereof is required with an adhesive such as the one described in Patent Document 2.

The inventor actively studied and found that a rubber was able to be acquired that was excellent in the compression set and also in the crosslinking-bonding even without causing any secondary crosslinking therein, by mixing calcium hydroxide by a specific amount relative into a binary ethylene-acrylic rubber polymer, and the inventor was led to the present invention.

The applicant has so far disclosed in Patent Document 3 a technique of improving the compression set by mixing calcium hydroxide into a sulfur crosslinking-based acrylic rubber (ACM) and causing secondary crosslinking therein (Patent Document 3). Whereas, the fact was first found by the inventor that, as above, the binary ethylene-acrylic rubber was excellent in the compression set and also in especially the crosslinking-bonding even without causing any secondary crosslinking therein when calcium hydroxide was contained therein, and this fact was not able to be anticipated from Patent Document 3.

An object of the present invention is to provide an ethylene-acrylic rubber composition that is excellent in the compression set and also in the crosslinking bonding even without causing any secondary crosslinking therein, an ethylene-acrylic rubber produced by causing primary crosslinking in the composition, a rubber metal composite formed by bonding the ethylene-acrylic rubber and a metal with each other, and a bonded piston sealing including the rubber metal composite.

Other objects of the present invention will become apparent when reading the description below.

Means for Solving Problems

The above problems are solved by the following inventions.

1. An ethylene-acrylic rubber composition comprising 1 to 7 PHR by weight of calcium hydroxide relative to 100 PHR by weight of a binary ethylene-acrylic rubber polymer that comprises ethylene and an acrylic acid ester.
2. The ethylene-acrylic rubber composition according to 1, comprising 1 to 3 PHR by weight of the calcium hydroxide relative to 100 PHR by weight of the binary ethylene-acrylic rubber polymer.

The ethylene-acrylic rubber composition according to 1 or 2, wherein the acrylic acid ester is methyl acrylate.
4. An ethylene-acrylic rubber formed by causing peroxide-crosslinking by primary crosslinking in the ethylene-acrylic rubber composition according to any one of 1 to 3.
5. A rubber metal composite formed by crosslinking-bonding the ethylene-acrylic rubber according to 4 and a metal with each other bonded with the primary crosslinking.
6. A bonded piston sealing comprising the rubber metal composite according to 5.

Effect of the Invention

According to the present invention, such items can be provided as the ethylene-acrylic rubber composition that is excellent in the compression set and also in the crosslinking bonding even without causing any secondary crosslinking therein, the ethylene-acrylic rubber produced by causing primary crosslinking in the composition, the rubber metal composite formed by bonding the ethylene-acrylic rubber and a metal with each other, and the bonded piston sealing including the rubber metal composite.

DETAILED DESCRIPTION OF THE INVENTIONS

An ethylene-acrylic rubber composition of the present invention is formed by mixing 1 to 7 PHR by weight of calcium hydroxide into 100 PHR by weight of a binary ethylene-acrylic rubber (AEM) polymer containing ethylene and an acrylic acid ester.

The ethylene-acrylic rubber composition achieves an effect that the ethylene-acrylic rubber composition is excellent in the compression set and also in the crosslinking bonding even without causing any secondary crosslinking therein.

According to the ethylene-acrylic rubber composition, when crosslinking is caused therein, the compression set and the crosslinking bonding can be achieved that are at the same level as the level of those of the traditional material. The "traditional material" referred to herein is especially an acrylic rubber (ACM) composition and is, for example, a composition described later in Reference Example 1.

According to the ethylene-acrylic rubber composition, when crosslinking is caused therein, excellent Mooney scorch properties (for example, the lowest Mooney viscosity Vm and the scorch time T5), excellent original physical properties (for example, the hardness (Type A Durometer), the tensile strength, and elongation at break) can also be realized.

The "crosslinking" refers to causing a binary ethylene-acrylic rubber (AEM) polymer to be converted into an elastic substance by causing crosslinking in the plastic substance using a crosslinking agent. Types of crosslinking include, for example, sulfur crosslinking (may also be referred to as "crosslinking (vulcanization)" using, as a crosslinking agent, a compound that contains sulfur and peroxide-crosslinking using a peroxide, and the peroxide-crosslinking is advantageously used in the present invention.

The binary AEM polymer is not especially limited only when the binary AEM polymer is a polymer containing ethylene and an acrylic acid ester (also referred to as "ethylene-acrylic acid ester copolymer"). Examples of the acrylic acid ester include, for example, methyl acrylate, ethyl acrylate, butyl acrylate (n-butyl acrylate), 2-ethylhexyl acrylate, 2-dimethylaminoethyl acrylate, 2-hydroxyethyl acrylate, and the like and, above all, preferably, methyl acrylate is used. Preferably, the binary AEM polymer is a binary AEM polymer containing ethylene and methyl acrylate (also referred to as "ethylene-methyl acrylate copolymer").

Commercially available substances are also usable each as the binary AEM polymer. For example, commercially available substances are each usable such as "VAMAC DP" produced by DuPont as the binary AEM polymer containing ethylene and methyl acrylate.

Though calcium hydroxide may be a solid one or a liquid one, preferably, the solid one is used and, more preferably, a powdered one is used. Commercially available substances are also usable each as the powdered calcium hydroxide and, preferably, for example, "CALDIC #2000" produced by Ohmi Chemical Industry Co., Ltd., and the like are usable.

The amount of calcium hydroxide may only be within a range from 1 to 7 PHR by weight, preferably, is set to be in a range from 1 to 5 PHR by weight, more preferably, is set to be in a range from 1 to 4 PHR by weight, and, most preferably, is set to be in a range from 1 to 3 PHR by weight, relative to 100 PHR by weight of the binary AEM polymer. An effect of further excellence in the compression set is thereby achieved without causing any secondary crosslinking in the polymer. In addition, the Mooney scorch properties and the original physical properties also can further be improved.

Components necessary for the crosslinking (for example, a crosslinking agent and the like) can be properly mixed in the above rubber composition.

Preferably, any crosslinking agent capable of forming peroxide-crosslinking in the binary AEM polymer can be used as the crosslinking agent and, for example, organic peroxides can advantageously be exemplified.

The organic peroxides are not especially limited and examples thereof include, for example, bis(t-butylperoxy-isopropyl)benzene, t-butyl peroxide, dicumyl peroxide, 2,5-dimethyl-2,5-di(t-butylperoxy)hexane, 2,5-dimethyl-2,5-di(t-butylperoxy)hexyne-3,1,1-di(butylperoxy)-3,3,5-trimethylcyclohexane, and the like, and, above all, preferably, bis(t-butylperoxyisopropyl)benzene is used.

The amount of the crosslinking agent is not especially limited, and the crosslinking agent is mixed, for example, preferably, in a range from 0.1 to 15 PHR by weight and, more preferably, in a range from 3 to 12 PHR by weight relative to 100 PHR by weight of the binary AEM polymer.

The rubber composition may further include other components as far as the other components do not impair the effect of the present invention. For example, a co-crosslinking agent, a reinforcing agent, a filler, an antiaging agent, a processing aid, a plasticizing agent, and the like may properly be mixed in as the other components.

Preferably, the rubber composition is kneaded. For the kneading, a roll mill, a kneader, and the like are usable that are known kneading means.

A crosslinked rubber (also simply referred to as "rubber") can be acquired by causing crosslinking in the above rubber composition (an un-crosslinked rubber).

The crosslinking conditions for the crosslinking of the rubber composition (the un-crosslinked rubber) are not especially limited and, preferably, the crosslinking is caused to takes place, for example, at a temperature in a range from 150 to 250° C. and for a time period in a range from 30 seconds to 30 minutes.

The scheme of the crosslinking is not especially limited and, for example, oven-crosslinking, pressing-crosslinking, and the like are usable and, preferably, the pressing-crosslinking is used. The crosslinking and the casting can simultaneously be conducted by the pressing-crosslinking.

Preferably, for example, a composite formed by bonding a rubber and other members with each other is acquired by causing the pressing-crosslinking in the rubber composition that is bonded to another arbitrary member. A rubber metal composite using a metal as the other member can advantageously be exemplified as the composite.

For example, a bonded piston sealing (BPS: including a piston sealing, a canceller sealing, a drum sealing, and the like) of a rubber lip crosslinking bonding type, used in clutch coupling in an automatic transmission (AT) of a vehicle such as an automobile can advantageously be exemplified as the rubber metal composite.

The BPS generally includes a metal ring that is oil-hydraulically actuated in the automatic transmission (is caused to conduct a reciprocal motion), and a rubber sealing that is crosslinking-bonded to the metal ring to achieve a sealing action.

For the rubber metal composite like the BPS, from the viewpoint of advantageously bonding the rubber and the metal with each other, preferably, an adhesive is applied in advance onto the surface of the metal for the crosslinking. Preferably, the applied adhesive is also baked by applying a heating process thereto.

The adhesive used in the bonding is not especially limited, and an adhesive including novolac-type phenolic resin as its adhesive component can advantageously be exemplified. Preferably, the adhesive including the novolac-type phenolic resin further includes a resol-type phenolic resin as a hardening agent. Most preferably, an adhesive is used that includes as its adhesive component a novolac-type phenolic resin acquired from a mixture of m-cresol and p-cresol and that is added with a resol-type phenolic resin as a hardening agent. Examples of this adhesive include, for example, an adhesive described in JP-A-10-121020.

EXAMPLES

Examples of the present invention will be described below and the present invention is not limited to such Examples.

Example 1

(1) Rubber Composition
The following formulation of the rubber composition was employed:
Ethylene-methyl acrylate copolymer (AEM) ("VAMAC DP" produced by DuPont), 100 PHR by weight
Calcium hydroxide ("CALDIC #2000" produced by Ohmi Chemical Industry Co., Ltd., 1 PHR by weight
Carbon black (FEF) ("SEAST G-SO" produced by Tokai Carbon Co., Ltd.), 70 PHR by weight
Dry silica ("AEROSIL 200" produced by Japan Aerosil), 5 PHR by weight
Antiaging agent (4,4'-bis($\alpha,\alpha$-dimethylbenzyl)diphenylamine ("Nocrac CD" produced by Ouchi Shinko Chemical Industrial, 1 PHR by weight
Processing Aid 1; "Stearic Acid TST" produced by Miyoshi Oil and Fat Co., Ltd., 1 PHR by weight
Processing Aid 2; Polyoxyethylenealkyl ether phosphoric acid ("Phosphanol RL210" produced by Toho Chemical Industry Co., Ltd., 1.25 PHR by weight
Processing Aid 3; N-octadecylamine ("ARMEEN 18D" produced by Lion-Akzo Co., Ltd.), 0.5 PHR by weight
Plasticizer; Adipic acid(butoxyethyl)disester ("Adekacizer RS-107)" produced by Asahi Denka Kogyo Co., Ltd., 10 PHR by weight
Crosslinking agent 1; Bis(t-butylperoxyisopropyl)benzene ("Peroxymon F40" produced by NOF Corporation), 7.5 PHR by weight
Co-crosslinking agent; Trimethylolpropane trimetacrylate ("Acryester TMP" produced by Mitsubishi Rayon Co., Ltd.), 2 PHR by weight (2) Crosslinking Conditions:
Primary crosslinking was caused in the acquired rubber composition at 200° C. for 3 minutes (pressing-crosslinking) to acquire a crosslinked rubber. This crosslinking was peroxide-crosslinking by Crosslinking agent 1 that is an organic peroxide. No secondary crosslinking was caused.

Example 2

(1) Rubber Composition:
A rubber composition was acquired in the same way as that of Example 1 except the fact that the amount of calcium hydroxide was set to be 3 PHR by weight in Example 1.

(2) Crosslinking Conditions:
Crosslinking was caused in the acquired rubber composition under the same crosslinking conditions as those of Example 1 to acquire a crosslinked rubber.

Example 3

(1) Rubber Composition:
A rubber composition was acquired in the same way as that of Example 1 except the fact that the amount of calcium hydroxide was set to be 5 PHR by weight in Example 1.

(2) Crosslinking Conditions:
Crosslinking was caused in the acquired rubber composition under the same crosslinking conditions as those of Example 1 to acquire a crosslinked rubber.

Example 4

(1) Rubber Composition:
A rubber composition was acquired in the same way as that of Example 1 except the fact that the amount of calcium hydroxide was set to be 7 PHR by weight in Example 1.

(2) Crosslinking Conditions:
Crosslinking was caused in the acquired rubber composition under the same crosslinking conditions as those of Example 1 to acquire a crosslinked rubber.

(Reference Example 1) *the Traditional Materials (an ACM Composition)

(1) Rubber Composition:
The following formulation of the rubber composition was employed:
Acrylic rubber (ACM) ("Noxtite PA401" produced by Unimatec Co., Ltd.), 100 PHR by weight
Carbon black (FEF) ("SEAST G-SO" produced by Tokai Carbon Co., Ltd.), 70 PHR by weight
Dry silica ("AEROSIL 200" produced by Japan Aerosil), 5 PHR by weight
Antiaging agent (4,4'-bis($\alpha,\alpha$-dimethylbenzyl)diphenylamine ("Nocrac CD" produced by Ouchi Shinko Chemical Industrial), 1 PHR by weight
Processing Aid 1; "Stearic Acid TST" produced by Miyoshi Oil and Fat Co., Ltd, 1 PHR by weight
Processing Aid 4; Paraffin wax ("Sunnoc" produced by Ouchi Shinko Chemical Industrial), 2 PHR by weight
Crosslinking agent 2; Sulfur, 0.6 PHR by weight
Crosslinking (Vulcanizing) Accelerator 1; Purified soda soap ("NS-Soap" produced by Kao Corp.), 5 PHR by weight
Crosslinking (Vulcanizing) Accelerator 2; Potassium stearate ("Nonsal SK-1" produced by NOF Corporation), 2 PHR by weight.

(2) Crosslinking Conditions:
Primary crosslinking (pressing-crosslinking) was caused in the acquired rubber composition at 200° C. for 3 minutes and secondary crosslinking (oven-crosslinking) was also caused therein at 170° C. for 6 hours to acquire a crosslinked rubber. These crosslinking were crosslinking (vulcanization) caused by Crosslinking agent 2 that was sulfur.

Comparative Example 1

(1) Rubber Composition:
The same formulation as that of Reference Example 1 was employed for the rubber composition of Comparative Example 1.

(2) Crosslinking Conditions:

Primary crosslinking (pressing-crosslinking) was caused in the acquired rubber composition at 200° C. for 3 minutes to acquire a crosslinked rubber. This crosslinking was crosslinking (vulcanization) caused by Crosslinking agent 2 that was sulfur. No secondary crosslinking was caused therein.

Comparative Example 2

(1) Rubber Composition:

A rubber composition was acquired in the same way as that of Example 1 except the fact that no calcium hydroxide was mixed in Example 1.

(2) Crosslinking Conditions:

Crosslinking was caused in the acquired rubber composition under the same crosslinking conditions as those of Example 1 to acquire a crosslinked rubber.

Comparative Example 3

(1) Rubber Composition:

A rubber composition was acquired in the same way as that of Example 1 except the fact that the amount of calcium hydroxide was set to be 0.5 PHR by weight in Example 1.

(2) Crosslinking Conditions:

Crosslinking was caused in the acquired rubber composition under the same crosslinking conditions as those of Example 1 to acquire a crosslinked rubber.

Comparative Example 4

(1) Rubber Composition:

A rubber composition was acquired in the same way as that of Example 1 except the fact that the amount of calcium hydroxide was set to be 10 PHR by weight in Example 1.

(2) Crosslinking Conditions:

Crosslinking was caused in the acquired rubber composition under the same crosslinking conditions as those of Example 1 to acquire a crosslinked rubber.

Comparative Example 5

(1) Rubber Composition:

A rubber composition was acquired in the same way as that of Example 1 except the fact that 1 PHR by weight of magnesium hydroxide ("200-6H" produced by Kyowa Chemical Industry Co., Ltd.) was used instead of calcium hydroxide in Example 1.

(2) Crosslinking Conditions:

Crosslinking was caused in the acquired rubber composition under the same crosslinking conditions as those of Example 1 to acquire a crosslinked rubber.

Comparative Example 6

(1) Rubber Composition:

A rubber composition was acquired in the same way as that of Example 1 except the fact that 1 PHR by weight of aluminum hydroxide ("HIGILITE" produced by Showa Denko K.K.) was used instead of calcium hydroxide in Example 1.

(2) Crosslinking Conditions:

Crosslinking was caused in the acquired rubber composition under the same crosslinking conditions as those of Example 1 to acquire a crosslinked rubber.

2. Evaluation Methods (1) Mooney Scorch:

For each of the rubber compositions (non-crosslinked rubbers) of Examples, Reference Example, and Comparative Examples, a Mooney scorch test was conducted at a test temperature of 125° C. for a pre-heating time period of 1 minute using an L-shaped rotor according to JIS K6300-1 (2001), and the lowest Mooney viscosity Vm and the scorch time T5 were determined.

(2) Original Physical Properties:

For each of the crosslinked rubbers of Examples, Reference Example, and Comparative Examples, the original physical properties (the hardness (Type A Durometer), the tensile strength, and elongation at break) were measured.

<Measurement Methods> a. Hardness:

The hardness (Type A Durometer: instantaneous) was measured according to JIS K6253 (1997).

b. Tensile Strength:

The tensile strength (MPa) was measured according to JIS K6251 (2010).

c. Elongation at Break:

The elongation at break (%) was measured according to JIS K6251 (2010).

(3) Bonding Test:

A base material formed by a SPCC steel plate was prepared and was applied with chemical conversion treatment using magnesium zinc phosphate.

The adhesive including the novolac-type phenolic resin as its main component and the resol-type phenolic resin as a hardening agent was applied onto the SPCC steel plate applied with the chemical conversion treatment, and was dried, and a baking process was thereafter applied to the adhesive at 130° C. for 15 minutes.

The rubber composition (the non-crosslinked rubber) of each of Examples, Reference Example, and the Comparative Examples was joined to the SPCC steel plate to which the adhesive was attached by the baking, and the crosslinking was caused therein under the above crosslinking conditions for each of Examples, Reference Examples, and Comparative Examples to acquire the rubber metal composite.

For the acquired rubber metal composite, the rubber was peeled off from the SPCC steel plate and the rubber residual rate (%) was measured for the surface of the SPCC steel plate after the peeling.

The rubber residual rate (%) is a value in percentage acquired by dividing the area of the SPCC steel plate having therein the rubber remaining on the SPCC steel plate by the area of the joining face of the rubber-SPCC steel plate. The rubber can be evaluated to have a higher bonding property (that is, more excellent in the bonding property) as the rubber residual rate (%) is higher.

(4) Compression Set:

Crosslinking was caused in the rubber composition (the non-crosslinked rubber) of each of Examples, Reference Example, and Comparative Examples under the above crosslinking conditions for each of Examples, Reference Example, and Comparative Examples, and a ring-shaped sealing member (the diameter of the ring=φ3.1 cm) formed by the crosslinked rubber and having a cross-section of an O-like shape (a circular shape) was acquired. The compression set rate (%) thereof was measured after heat-resisting aging at 120° C. for 70 hours according to JIS K6262 (2013). The compression rate was 25%.

The above evaluation results are listed in Table 1.

TABLE 1

| | | Example 1 | Example 2 | Example 3 | Example 4 | Reference Example 1 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Amount (Part(s) by Weight) | ACM Polymer | — | — | — | — | 100 | 100 | — | — | — | — | — |
| | Binary AEM Polymer | 100 | 100 | 100 | 100 | — | — | 100 | 100 | 100 | 100 | 100 |
| | Carbon Black | 70 | 70 | 70 | 70 | 70 | 70 | 70 | 70 | 70 | 70 | 70 |
| | Dry Silica | 5 | 5 | 5 | 5 | 5 | 5 | 5 | 5 | 5 | 5 | 5 |
| | Antiaging Agent | 1 | 1 | 1 | 1 | 1 | 1 | 1 | 1 | 1 | 1 | 1 |
| | Processing Aid 1 | 1 | 1 | 1 | 1 | 1 | 1 | 1 | 1 | 1 | 1 | 1 |
| | Processing Aid 2 | 1.25 | 1.25 | 1.25 | 1.25 | — | — | 1.25 | 1.25 | 1.25 | 1.25 | 1.25 |
| | Processing Aid 3 | 0.5 | 0.5 | 0.5 | 0.5 | — | — | 0.5 | 0.5 | 0.5 | 0.5 | 0.5 |
| | Processing Aid 4 | — | — | — | — | 2 | 2 | — | — | — | — | — |
| | Plasticizer | 10 | 10 | 10 | 10 | — | — | 10 | 10 | 10 | 10 | 10 |
| | Calcium Hydroxide | 1 | 3 | 5 | 7 | — | — | — | 0.5 | 10 | — | — |
| | Magnesium Hydroxide | — | — | — | — | — | — | — | — | — | 1 | — |
| | Aluminum Hydroxide | — | — | — | — | — | — | — | — | — | — | 1 |
| | Crosslinking Agent 1 | 7.5 | 7.5 | 7.5 | 7.5 | — | — | 7.5 | 7.5 | 7.5 | 7.5 | 7.5 |
| | Crosslinking Agent 2 | — | — | — | — | 0.6 | 0.6 | — | — | — | — | — |
| | Crosslinking (Vulcanizing) Accelerator 1 | — | — | — | — | 5 | 5 | — | — | — | — | — |
| | Crosslinking (Vulcanizing) Accelerator 2 | — | — | — | — | 2 | 2 | — | — | — | — | — |
| | Co-Crosslinking Agent | 2 | 2 | 2 | 2 | — | — | 2 | 2 | 2 | 2 | 2 |
| Crosslinking Condition | Primary Crosslinking | Present | Present | Present | Present | Present | Present | Present | Present | Present | Present | Present |
| | Secondary Crosslinking | Absent | Absent | Absent | Absent | Present | Absent | Absent | Absent | Absent | Absent | Absent |
| Evaluation | Mooney Scorch (125° C.) | | | | | | | | | | | |
| | Lowest Mooney Viscosity Vm (M) | 25.8 | 29.7 | 30.3 | 30.1 | 69 | 69 | 24.3 | 25.7 | 31.5 | 26.1 | 22.9 |
| | Scorch Time T5 (min) | 6.9 | 6.5 | 6.2 | 6.0 | 6.5 | 6.5 | 7.5 | 7.2 | 5.5 | 6.8 | 6.6 |
| | Original Physical Properties | | | | | | | | | | | |
| | Hardness (Type A Durometer) | 80 | 78 | 79 | 80 | 82 | 80 | 79 | 78 | 81 | 79 | 78 |
| | Tensile Strength (MPa) | 13 | 12.2 | 11.8 | 11.6 | 12.2 | 11.7 | 13.1 | 12.3 | 11.6 | 13.3 | 13.2 |
| | Elongation at Break (%) | 260 | 250 | 260 | 250 | 160 | 180 | 260 | 260 | 250 | 260 | 260 |
| | Bonding Test | | | | | | | | | | | |
| | Rubber Residual Rate (%) (Normal State) | 100 | 100 | 100 | 100 | 100 | 100 | 0 | 0 | 100 | 0 | 0 |
| | Copression Set Test | | | | | | | | | | | |
| | Copression Set Rate (%) | 30 | 30 | 31 | 31 | 31 | 44 | 28 | 29 | 32 | 29 | 30 |

<Evaluation>

Compared to Reference Example 1 (the traditional material), Examples 1 to 4 each had the same level of compression set even without the secondary crosslinking and each needed a lower production cost. The scorch time T5 of each of Examples 1 to 4 was equal to 6 minutes or longer and the green stock storage property was therefore sufficient and the bonding property was also excellent.

Though Reference Example 1 (the traditional material) was excellent in both of the bonding property and the compression set, the production cost of Reference Example 1 was high because the secondary crosslinking was caused therein.

Comparative Example 1 was produced by causing only the primary crosslinking in the ACM composition used in Reference Example 1 (without the secondary crosslinking) and it can be seen that the compression set thereof was significantly degraded.

Compared to Reference Example 1 (the traditional material), Comparative Examples 2 and 3 each had excellent compression set while their bonding property was completely unobservable.

Though Comparative Example 4 was excellent in the bonding property, the compression set of Comparative Example 4 was inferior compared to Comparative Example 2 (having no calcium hydroxide added thereto), and the green stock storage property of Comparative Example 4 was unstable because the scorch time T5 thereof was shorter than 6 minutes.

From Comparative Examples 5 and 6, it can be seen that the bonding property was completely unobservable with the use of any metal hydroxide other than calcium hydroxide.

I claim:

1. A rubber metal composite formed by crosslinking-bonding an ethylene-acrylic rubber and a metal with each other bonded with primary crosslinking, wherein the ethylene-acrylic rubber formed by causing peroxide-crosslinking by the primary crosslinking in an ethylene-acrylic rubber composition comprising an organic peroxide and 1 to 7 PHR by weight of calcium hydroxide relative to 100 PHR by weight of a binary ethylene-acrylic rubber polymer that comprises ethylene and an acrylic acid ester.

2. The rubber metal composite according to claim 1, wherein the ethylene acrylic-rubber composition comprising the organic peroxide and 1 to 3 PHR by weight of the calcium hydroxide relative to 100 PHR by weight of the binary ethylene-acrylic rubber polymer.

3. The rubber metal composite according to claim 1, wherein the acrylic acid ester is methyl acrylate.

4. A bonded piston sealing comprising the rubber metal composite according to claim 1.

5. A manufacturing method of a rubber metal composite comprising the steps of: forming an ethylene-acrylic rubber by causing peroxide-crosslinking by primary crosslinking in an ethylene-acrylic rubber composition comprising an organic peroxide and 1 to 7 PHR by weight of calcium hydroxide relative to 100 PHR by weight of a binary ethylene-acrylic rubber polymer that comprises ethylene and an acrylic acid ester so that the rubber metal composite is formed by crosslinking-bonding the ethylene-acrylic rubber and the metal with each other bonded with the primary crosslinking.

* * * * *